United States Patent [19]
Yap et al.

[11] Patent Number: 6,111,506
[45] Date of Patent: Aug. 29, 2000

[54] METHOD OF MAKING AN IMPROVED SECURITY IDENTIFICATION DOCUMENT INCLUDING CONTACTLESS COMMUNICATION INSERT UNIT

[75] Inventors: Chas Hock Eng Yap, Petaling Jaya; Foong Mei Chua, Penang, both of Malaysia

[73] Assignee: Iris Corporation Berhad, Kuala Lumpur, Malaysia

[21] Appl. No.: 08/950,057

[22] Filed: Oct. 14, 1997

Related U.S. Application Data

[60] Provisional application No. 60/028,351, Oct. 15, 1996.

[51] Int. Cl.[7] .................................................... G08B 13/14
[52] U.S. Cl. ............................... 340/572.1; 340/572.8; 340/825.3; 340/825.31; 340/825.33; 340/825.34; 340/825.54; 380/23; 380/24
[58] Field of Search ............................ 340/572.1, 572.7, 340/572.8, 568, 825.3, 825.31, 825.33, 825.34, 825.54, 551; 380/23, 24, 25; 356/71; 29/825, 829, 836; 364/409; 395/933

[56] References Cited

U.S. PATENT DOCUMENTS

| | | | |
|---|---|---|---|
| 4,510,489 | 4/1985 | Anderson, III et al. | 340/572 |
| 4,985,920 | 1/1991 | Seki | 380/23 |
| 5,457,747 | 10/1995 | Drexler et al. | 380/24 |
| 5,528,222 | 6/1996 | Moskowitz et al. | 340/572 |
| 5,583,489 | 12/1996 | Loemker et al. | 340/572 |
| 5,629,981 | 5/1997 | Nerlikar | 380/23 |
| 5,815,252 | 9/1998 | Price-Francis | 356/71 |

*Primary Examiner*—Benjamin C. Lee
*Attorney, Agent, or Firm*—Milde, Hoffberg & Macklin, LLP

[57] ABSTRACT

A method of making an improved security identification document includes the steps of forming a contactless communication insert unit by electrically connecting an integrated circuit including a microprocessor, a controller, a memory unit, a radio frequency input/output device and an antenna; disposing the contactless communication insert unit on a substrate and laminated to form a laminated substrate; supplying a first sheet of base material; supplying a second sheet of base material; disposing the second sheet of base material on top of the first sheet of base material and inserting the laminated substrate including the contactless communication insert unit between the first and second sheets of base material; and joining a third sheet of base material to the first and second sheets of base material having the laminated substrate disposed therebetween, the third sheet of base material containing printed text data located so as to be readable by humans.

7 Claims, 3 Drawing Sheets

METHOD OF MAKING AN IMPROVED SECURITY IDENTIFICATION DOCUMENT INCLUDING CONTACTLESS COMMUNICATION INSERT UNIT

This application is a regular utility patent application claiming priority of Provisional Patent Application 60/028,351 filed on Oct. 15, 1996, now pending.

BACKGROUND OF THE INVENTION

1. Field of the Invention

The present invention relates to an improved security identification document for use in a wide variety of identification and security systems and a method of making the improved security document. Furthermore, the present invention relates to an improved security access and authorization system using the improved security identification documents. As part of the improved security access and authorization system, an improved method for verifying and authenticating biometrics data is provided. In addition, the present invention relates to an improved airport security system including an automated personal identification and verification security system including an improved security document generating system, an improved luggage handling and identification system, a system and method of matching a person with one or more of (1) a personal identification document, (2) a personal object or luggage identification document and (3) a travel authorization document; and the present invention also relates to an improved security identification document in the form of a personal identification document such as a passport, visa, driver's license, a frequent traveler's card, a worker's identification card, a social security card, a healthcare card, land title document, ATM card, credit card, phone card, welfare recipient card, green card, gun permit and registration card, an object or luggage identification document or a travel authorization document and a method of making such improved security identification documents.

2. Description of Related Art

Conventional security systems are heavily dependent upon the type of personal identification cards and the degree of difficulty of forging or altering such documents. Most conventional personal identification cards contain a photograph attached to a substrate and alphanumeric data which is printed on the substrate and/or stored in a magnetic strip provided on the card. These conventional personal identification cards are relatively easy to forge and alter and there is no reliable mechanism for detecting such forgery or alteration.

In addition, several conventional security systems rely on security personnel to attempt to verify a person's identity by comparing a person's appearance with a photograph on an identification document. Such a system is time consuming and is subject to human error.

Several security systems for identifying persons and matching a person to one or more of a conventional personal identification document, a travel authorization document or boarding pass, and a luggage or personal object identification document, are known and in use today. The conventional personal identification documents may include a driver's license or passport containing a photograph and written personal information such as name, address, height, weight, date of birth, social security number and other information. Some of the alphanumeric data may be stored in a magnetic strip on the personal identification document so as to be capable of being read by a conventional magnetic data reader.

The conventional object or luggage identification document usually comprises a ticket having data such as flight number, the name of the destination airport and departure airport and may include bar code data or other data capable of being optically or magnetically scanned for identifying an owner of the luggage and the desired destination of the luggage.

The conventional travel authorization documents usually comprise a boarding pass or ticket issued in response to the passenger providing a ticket agent with a purchased ticket and showing the ticket agent a conventional personal identification document. The conventional travel authorization document may also include alphanumeric data which is magnetically stored and readable or alphanumeric data that is readable using an optical scanning device.

These conventional identification documents are used in conventional security systems as follows. A passenger having a ticket for authorized travel will enter the airport and may have luggage or other personal objects scanned by an X-ray machine and/or metal detectors to check for explosive devices or other forbidden objects such as guns or knives. This luggage may include luggage to be checked and stored in the cargo area of an airplane and "carry-on" luggage which is to be carried onto the airplane by the passenger. After passing the luggage through the X-ray machine and/or metal detector, the passenger gives the luggage to be checked and stored in the cargo area of the airplane to a ticket agent along with a passenger ticket for authorized travel.

The ticket agent usually requests that the passenger present a conventional photo identification document if traveling domestically and a passport if the passenger is traveling internationally. The ticket agent visually matches the name on the passenger ticket with the name on the driver's license or passport and confirms that the photograph on the photo identification document is the person presenting the ticket for travel. The ticket agent then issues a boarding pass containing the passenger name, flight information, departure gate, seat assignment and other alphanumeric information which may be typed and/or magnetically stored on the boarding pass.

The ticket agent also generates a luggage identification tag or ticket for the checked luggage to be sent to the cargo area of the airplane. The luggage identification tag usually comprises a two part ticket, wherein one part of the ticket is attached to the luggage and the other part of the ticket is given to the passenger for identification and retrieval of the checked luggage at the arrival airport.

This system leads to many problems. The name on the passenger ticket can easily be forged especially given the fact that a passenger can provide an airline with any false name at the time of purchasing a ticket. Similarly, a driver's license, passport or other personal identification document can easily be forged. Furthermore, the ticket agent may make a human error or even forget to match the ticket, personal identification document and person requesting access to the boarding area.

After the passenger has checked the luggage to be carried in the cargo area of the airplane and has received a boarding pass from the ticket agent, the passenger then proceeds to the boarding area with any carry-on luggage. Before entering the boarding area, the traveler may be required to pass through another X-ray machine and/or metal detector and may also be required to show a boarding pass to gain access to the boarding area. Because the boarding pass may not be compared to the personal identification document during this second inspection, it is possible that the person who checked in with the ticket agent could give the boarding pass to another person and therefore, another person with no identification or forged identification may gain access to the boarding area and airplane. Also, it is possible that the person who provided the ticket agent with checked baggage to be sent to the cargo area of an airplane never attempt to enter the boarding area but instead only desires to have the checked luggage placed on the airplane. This may be an effective way for a terrorist to place a bomb on a plane.

After a passenger enters the boarding area, the passenger is usually only required to show the gate attendant or boarding attendant a boarding pass to gain access and entry to the airplane. Even if the passenger is required to again show personal identification, the passenger can show a forged personal identification document as described above.

After the passenger reaches a destination, there is no clear way of making sure that all passengers have left the airplane and are not awaiting a subsequent flight as a stowaway. Also, it is quite common that a thief may pose as an arriving passenger having a forged baggage claim ticket and steal a passenger's luggage. This type of occurrence is not prevented using the conventional identification documents and airport security system.

Other disadvantages with conventional security and luggage handling systems are also evident. The automatic luggage handling systems rely on relatively slow optical scanning technology which is not always reliable and slows down the luggage distribution and loading process. Because of the slow luggage identification systems, it is difficult to reconcile checked bags with boarded passengers to make sure that all passengers who check luggage have boarded the plane because of the relatively short time from check-in to boarding.

Also, under the current system, checked bags are usually loaded onto an airplane and then must be unloaded if the passenger or owner of the checked baggage does not board the airplane. This is a problem because the luggage is actually placed on the airplane for a period of time during which a bomb could explode or the luggage may not be identified and removed in time before the airplane leaves the airport.

In general, when efforts have been made to enhance the security and reliability of conventional identification documents and systems relying on such documents for maintaining security, increased costs, time consumption and security personnel have been required without successfully obtaining a highly reliable security system and preventing many of the problems with forgery and tampering with security identification documents and breaching of conventional security systems.

Furthermore, although multi-application data cards such as smart cards are known, these cards cannot be adapted to be used a personal identification card or to include personal identification data because of the ease of forging and/or tampering with the data stored on the multi-application data card. Thus, it has not been possible to combine a personal identification document such as a passport and/or driver's license with other related applications such as electronic ticketing for travel such as "EZ Ticket" processes, frequent travel awards, frequent purchase awards, credit or debit transactions, and other similar transactions or applications.

SUMMARY OF THE INVENTION

The preferred embodiments of the present invention provide improved security identification documents and a method of making the improved security identification documents. The preferred embodiments of the present invention also provide a method of generating an improved security document such as a passport or driver's license which is in the form of the improved security identification document. These improved security identification documents are preferably used to identify a person, a person's authorized access to certain areas, an object such as a luggage, cargo, packages, etc., travel information or access and any other suitable information. The improved security identification documents may preferably be in the form of a driver's license, passport, visa, birth certificate, security identification card, visitor identification card, foreign worker's identification card, Green card, credit card, ATM card, welfare benefits card, national identification card, border access and identification card, gun registration or owner identification card, hazardous material identification card, object identification card or other suitable personal or object identification document. In addition, in certain preferred embodiments, the improved security identification documents may be in the form of a boarding pass, a travel authorization ticket, an object or luggage identification ticket or other suitable identification document for use with a person or an object security and verification system.

The improved security identification documents may be used in any environment where identification, security or authorized ownership or possession of restricted use materials such as guns, hazardous materials or other objects is a concern. Such examples of these environments and objects include restricted access to national and international borders, buildings, parks, outdoor areas and access to passenger transport systems such as airports, public or private roads, train stations, ship embarkation and disembarkation terminals and other suitable secure areas and travel systems. This type of improved security personal identification card may also be especially useful at events such as the Olympics or sporting events where security is a concern.

In addition, the improved security personal identification documents may be in the form of cards and may comprise cards containing data which should not be accessible or capable of being written to by an unauthorized person. For example, a driver's license may preferably include biometrics information and information relating to a driver's status, number of accidents, speeding tickets, demerit points, etc. This data is all stored on the card such that the data cannot be altered ever or at least cannot be altered by an unauthorized person, such as the holder of the card. In addition, another example relates to a card for receiving welfare benefits such as food stamps. Such a card may contain biometrics data and may also contain data concerning how much welfare assistance a card holder is entitled to, how much welfare assistance has been used each month, and other suitable information. The data concerning the welfare assistance and related information could be stored on the card in such a manner that the data cannot be accessed by an unauthorized person such as the holder of the card. The biometrics information could be stored such that it cannot be alterable by anyone as described in the following paragraphs.

As will be apparent from the description of the preferred embodiments of the improved security personal identification document, the document may comprise data that can never be altered and data that can only be altered by an authorized user. More specifically, the memory provided in the improved security personal identification documents preferably includes memory areas which can only be written to once and if an attempt is made to alter in any way the data that has been written thereto once, that memory area is destroyed thereby rendering the improved security personal identification document useless. Other memory areas can be altered and written to more than once but only by an authorized person which feature is implemented by using appropriate data encryption and decryption schemes.

In addition, the preferred embodiments of the improved security personal identification document is not limited to personal biometrics data only, but instead can be used as a multi-application data card, if desired. In such an embodiment, the possibility of fraud occurring in a transaction involving one of the applications of the multi-application card is eliminated because of the non-alterable biometrics data contained on the multi-application card.

The preferred embodiments of the present invention also provide a method of obtaining accurately stored biometrics data for the improved security personal identification document such that the biometrics data is accurately stored in a non-alterable storage device and the same data is then printed in alphanumeric characters on the improved security personal identification document and/or stored on a storage device on the card that is adapted to be read by conventional magnetic or optical data readers.

The preferred embodiments of the present invention also provide an improved security system which uses the improved security identification documents and can be applied to any type of public or private passenger or cargo identification and transport system including airports, train stations, subways, roads, ships and other passenger transport systems. In addition, the improved security identification documents may be used for border control, checking authorized worker status such as a green card, a national identification card, a welfare authorization card, credit card transactions, bank card or ATM card transactions or other suitable uses.

The preferred embodiments of the present invention also provide an improved airport security system including an automated personal identification and verification security system also having an improved luggage handling and identification system, a system and method of matching a person with one or more of a personal identification document, an object or luggage identification document and a travel authorization document.

According to one preferred embodiment of the present invention, an improved security identification document includes at least one integrated circuit with a microprocessor, a microcontroller or other type of central processing unit adapted to read and write data stored therein and transmitted thereto. The improved security identification document also preferably includes at least one suitable memory storage device for storing data written to the document and for retrieving the data stored thereon. The memory for storing biometrics data may preferably comprise a plurality of memory locations which can only record data a single time and prevents the stored data from ever being altered. The memory for storing other data such as address, height, weight, last name, etc. may be stored in a memory that is capable of being altered, such as a magnetic storage medium. More specifically, the memory provided in the improved security identification document may include a ferroelectric random access memory (FRAM), DRAM, SRAM, flash memory or other suitable memory device.

In one preferred embodiment of the improved identification document, the document includes a microprocessor with memory as mentioned above and a radio frequency input/output interface device and antenna for providing the contactless communication between the improved security identification document and an identification document interface device. The identification document interface device is adapted to transfer data to and from the improved security identification document in a contactless manner, wherein the term "contactless" refers to non-galvanic contact and is in contrast with "contact" data communication such as magnetic data reading and writing where galvanic contact is made via a plurality of pins and an electrical "contact" is made during data transfer. While the radio frequency contactless data communication is a preferred embodiment, other suitable methods of data communication may also be used in combination with the contactless communication for communication between the improved security identification document and the identification document interface device.

In one preferred embodiment, the improved security identification document preferably comprises several layers of a substrate materials such paper or plastic and has at least one integrated circuit embedded in the layers forming the document. A contactless insert unit referred to as a laminated substrate including a central processing unit preferably in the form of a microprocessor including memory, a data input/output device and an antenna are provided on a suitable substrate. The substrate is then inserted and adhered preferably between two sheets of base material which are joined together with the contactless insert unit located there between. An additional or third base sheet of suitable material is joined to the combined two base sheets and contactless insert. This third base sheet preferably contains printed text located to be accessible and readable whereas the data contained on the contactless insert unit is not accessible or readable by humans.

A cover page is preferably attached to the third base sheet. To ensure maximum security of the documents, the third page with printed text is stitched onto the third base sheet and the cover page using tamper-proof stitching. The contactless insert is integrated into the contactless insert to form an integral improved security identification document.

For particular types of identification documents, such as passports or driver's licenses, a relatively rigid cover may be provided and joined to the integral unit comprising the base sheets and the contactless insert.

The integrated circuit thus embedded in the improved security identification document is capable of storing personal and biometrics data such as a still color photograph, a video image, a two or three dimensional face scan, a palm print, fingerprints, a retina scan, a voice print or other suitable data for identification of the person to whom the improved security identification document is issued.

If the improved security identification document is to be used to identify non-personal objects, such as luggage, cargo, packages, mail, travel authorization, travel departure and arrival information, security access information and other suitable or desired information, this information is transferred from the document interface device using the non-contact communication protocol discussed above.

The data stored in the integrated circuit of the improved security identification document preferably is encrypted using proprietary data compression and encryption technology to make forgery or data tampering virtually impossible. In addition, all of the improved security identification documents interface with a device comprising a security system to be accessed by the improved security identification documents use the same data compression and encryption technology so as to ensure system integrity and security. This system will eliminate personal identification document forgery or tampering because the encrypted microprocessor stored data cannot be forged or tampered with and the data contained in the interface devices and identification documents cannot be altered.

In a preferred embodiment, each microchip in the integrated circuit of the improved security identification document preferably has a read and write memory of suitable size and may contain thousand of transistors for storing and transmitting information to and from the improved security identification document.

As mentioned above, the improved security identification of the preferred embodiments of the present invention may also comprise travel authorization documents such as a boarding pass and object or luggage identification documents. Each of these documents may be generated according to the method of making the improved security document of the preferred embodiments of the present invention. Each of these documents may preferably include a contactless insert unit as described above which is embedded in the layers of the document. The boarding pass or luggage ticket forming one preferred embodiment of the improved security identification document preferably includes biometrics data such as a facial image, a palm scan, fingerprint, retina scan, voice pattern etc. which is recorded onto the improved security identification document as the biometrics data is being input to a biometrics data input device which is preferably connected to the improved security identification document interface device. The data stored on the boarding pass or luggage identification ticket also can be used in conjunction with and compared to the data stored on the improved security personal identification card or pass described above to match and verify a passenger with the passenger's security documents including a boarding pass and luggage identification ticket.

According to another preferred embodiment of the present invention, a method of making improved security personal identification document includes making a document with an integrated circuit which is preferably based on smart card technology. The integrated circuit preferably has components which use radio frequency transmission and reception communication protocols to form a contactless smart document or close-coupling contactless smart card.

In another preferred embodiment, an improved security system which uses the improved security identification documents described above, is provided. The improved security system may comprise an improved security identification document generator for generating new security identification documents. Alternatively, the improved security identification documents may have been generated previously according to the method described above and the improved security identification documents are supplied with data as described below.

The security system also preferably includes at least one security identification document interface device for transmitting data to and receiving data from existing security identification documents; a biometrics data input device connected to the security document interface device for inputting biometrics data to the security document interface device; wherein the security identification document interface device includes a comparison device for comparing data input from an improved security identification document and data input from the biometrics data input device for verifying identity of a person; and the interface device includes an indicator for indicating the result of the comparison device comparing the input biometrics data and the data read from the identification document.

The operation of a preferred embodiment of an improved security system is as follows. An improved security identification document of a person or object attempting to gain access to a secured area such as a border, an airport boarding gate or a secured building interfaces with the improved security identification document interface device so that the information stored on the improved security identification document is accessible At the same time, biometrics data from the person is input or scanned by a suitable biometrics recording device such as a camera for scanning a face, retina, ear, etc. or a palm or finger print scanner described above or any other suitable biometrics data input device. Then, the comparison device in the interface device compares all of the input data and transmits signals to an indicator to send a message or other signal for indicating whether the biometrics data input by the person via the biometrics data input device matches the data stored on the improved security identification document.

The improved security identification document interface device preferably comprises at least one computer with appropriate software and hardware for performing the functions described above. As mentioned previously, the data transferred to and from the computer to the improved security identification documents is preferably encrypted to provide maximum security.

In a preferred embodiment, the improved security system includes a plurality of improved security identification document interface devices and biometrics data input devices which each use a single proprietary, secret data encryption scheme to prevent tampering with the system data. In another preferred embodiment, the improved security system may preferably be an improved airport security system including an automated personal identification and verification security system including an improved security document generating system, an improved luggage handling and identification system, a system and method of matching a person with one or more of (1) a personal identification document, (2) personal object or luggage identification document and (3) a travel authorization document such as a boarding pass.

The method of checking and verifying personal and object identification and maintaining security using the improved airport security system according to the preferred embodiment of the present invention is as follows. A passenger arrives at the ticket counter and presents a ticket agent with an airline ticket and an improved security personal identification document such as a passport or driver's license having an embedded integrated circuit with encrypted biometrics data, such as a digitized facial image such as a two-dimensional or three-dimensional image; a palm print, finger print, retina scan voice print or other suitable biometrics data, stored therein for identifying the passenger. Before issuing a boarding pass or checking luggage, the ticket agent may first verify the identity of the passenger by making sure that the biometrics information stored on the improved security identification document matches that of the passenger. Accordingly, the ticket agent asks the passenger to interface with the suitable biometrics data input device, such as a facial capture device, a palm scanner, fingerprint scanner, retina scanner, voice pattern processor scanner or other suitable biometrics data input device. Using the biometrics data input device and the identification document interface device, the ticket agent checks to see if the biometrics information stored on the improved security identification document matches biometrics information input by the passenger to the biometrics data input device.

If there is no match of biometrics data, no boarding pass is issued and no luggage is checked. If there is a match of biometrics data, the boarding pass and luggage identification document are generated and issued after the ticket agent matches the flight reservation information contained on the ticket presented by the passenger with flight reservation information contained either in the identification document interface device or in a connected flight information computer. The boarding pass and luggage identification documents are preferably generated according to the method of making an improved security identification document described above and or by simply using a pre-formed improved security identification document and transmitting data to the microprocessor or the designated memory area of the integrated circuit embedded in the document for storing biometrics and other data thereon.

The biometrics data input by the passenger to the biometrics data input device at the ticket agent counter at the airport is preferably transferred to the document interface device and then stored onto both the boarding pass and luggage identification document in addition to the other flight departure and arrival information customarily contained on the boarding pass and luggage identification document, and any other suitable information such as country of citizenship, address, social security number, and other identifying information.

The boarding pass is given to the passenger and the luggage identification ticket is attached to the luggage which is then sent to a cargo area of an airplane to be boarded by the passenger. A luggage identification document may also be given to the passenger for later identification and verification of a match between luggage and the passenger at the arrival airport.

After receiving a boarding pass and checking luggage, the passenger proceeds to a boarding area. Before entering the boarding area, the passenger is preferably asked to pass through a security checkpoint which includes a biometrics data input device and an improved security identification document interface device. At the security checkpoint, the passenger is requested to interact with the biometrics data input device while also inserting the boarding pass into the improved security identification document interface device. The document interface device checks for a match between the input biometrics data and the biometrics data stored on the boarding pass.

If there is no match, the passenger is not allowed into the boarding area and the interface device sends a signal to the luggage handling system to remove the luggage from the luggage handling system and not to allow the luggage to be loaded onto the airplane. If there is a match, the passenger proceeds to the boarding gate and luggage is loaded onto the cargo area of the airplane.

At the boarding gate, the passenger may be again requested to pass a security checkpoint including a biometrics data input device and improved security identification document interface device to be sure that the passenger boards the plane and also to confirm that the boarding pass biometrics data still matches the biometrics data input by the passenger. This will also ensure that all passengers who checked in at the ticket counter to receive a boarding pass and those checked in at the boarding gate have boarded the plane.

If the passenger does not successfully pass the security checkpoint at the gate, the interface device sends a signal to the luggage handling system to remove the luggage from the luggage handling system and to prevent the luggage from being loaded onto the airplane. Also, the interface device readily identifies the passenger or passengers who have not boarded the airplane.

In one preferred embodiment of the present invention, it is not necessary to give the passenger a luggage identification ticket because the match between the luggage and the passenger is done using an improved security identification document interface device at the luggage claim area of the arrival airport. More specifically, the passenger can retrieve their checked luggage by simply interacting with a biometrics data input device which is connected to the luggage handling system. When the biometrics data is transmitted from the biometrics data input device to the luggage handling system, this data is matched with biometrics data contained on the luggage ticket on the luggage and the luggage handling system transfers the passenger's luggage to the exact location of the particular biometrics data input device where passenger input biometrics data.

Also, before leaving the luggage claim area, the passenger may be preferably required to interface with a biometrics data input device such as a facial image capture device, a palm scanner which also reads the biometrics data from the luggage identification document adhered to the luggage to confirm that the biometrics data matches and the passenger is the proper owner of the luggage. This avoids the problems with theft of luggage at the arrival airport.

As a result of the use of biometrics data input devices and improved security document interface devices of the system according to this preferred embodiment, the checked luggage arriving at the arrival airport could be placed on one universal conveyor without having to selectively distribute luggage to a certain luggage claim area or conveyor. When a passenger arrives at the luggage claim area, the passenger merely has to interface with a biometrics data input device which enters the data into a computer system controlling the luggage handling system. The computer system interacts with the luggage handling conveyor which includes at least one interface device for reading the luggage identification document as the luggage is moved on the conveyor.

The interface device of the luggage handling system preferably includes an improved security identification document interface device as described above. The interface device of the luggage handling system preferably uses radio frequency communication protocols similar to those used in the improved security identification document interface devices described above so as to detect radio frequencies in a 360 degree range thereby eliminating misreads as is so common with conventional character recognition devices. The use of the improved security luggage identification document and the interface device allows for rapid two way radio communication between the luggage handling system and the luggage. The improved security luggage identification document answers to a radio frequency signal sent out by the luggage system interface device by emitting its own radio message which includes luggage identification and other information such as flight detail and luggage destination.

Unlike known optical bar code readers commonly used which require clear line of sight with the luggage tag, the present system provides a ready and infallible means of identifying the owner and destination of the baggage. Also, unlike bar code technology, the radio frequency identification documents have been known to be capable of operating at two and one half times conventional optical scanning speeds providing much faster automated baggage handling.

The interface device of the luggage handling system inputs the data read from the luggage identification document into the computer system. The conveyor is preferably in the form of an endless loop with several tributary conveyors as used in airport baggage handling systems. Once the passenger interfaces with the biometrics data input device, the computer system sends a signal to the conveyor device to instruct the conveyor to distribute the luggage matching the biometrics data input by the passenger to the particular luggage claim area or conveyor where the passenger is located.

While most of the security systems of the prior art are used exclusively in airports throughout the world, the security system of the preferred embodiments of the present invention is not so limited. That is, the security system and preferred improved security documents may be used in one or more of airports, railroad stations, bus stations, mass transit stations and any other travel related system. Also, the improved security identification documents can be used by immigration officials to more reliably track the entry and exit of people to a specific country or region.

There are many other benefits, advantages and other uses which are possible with the improved security identification document and security system. The most significant advantage is the improved security and prevention of tampering and forgery of identification documents to combat terrorism, fraud, forgeries found in most document based security systems. The present system and method also provide greatly increased security and reliability without added delay and inconvenience.

In addition, with the features of the preferred embodiments mentioned above, it is possible to quickly and securely verify a passenger's identity and match the passenger's identity with other identification documents such as passport, driver's license, boarding pass and luggage identification documents. It is also possible to remove un-reconciled luggage from an airplane or secured area, reconcile a flight log, ensure all passengers have boarded or exited an airplane, prevent theft of luggage, expedite claiming of checked luggage, identify passengers and/or luggage which has not boarded or exited an airplane, provide fully automated baggage handling thereby eliminating lost and mis-routed baggage, enable rapid spot check identification of passengers at transit stops and secure baggage retrieval at destinations. Use of the improved security luggage identification documents also ensures that only the baggage for those passengers who have been identified at the departure gate are allowed to remain in the aircraft or board the aircraft before takeoff. In addition, the system and method of the preferred embodiments of the present invention eliminate considerable problems associated with passengers who have checked in baggage but do not arrive at gate or board plane. Furthermore, storage and location of each item of luggage is automatically and immediately identifiable.

These and other elements, features, and advantages of the preferred embodiments of the present invention will be apparent from the following detailed description of the preferred embodiments of the present invention, as illustrated in the accompanying drawings.

DETAILED DESCRIPTION OF PREFERRED EMBODIMENTS

Figure 1:
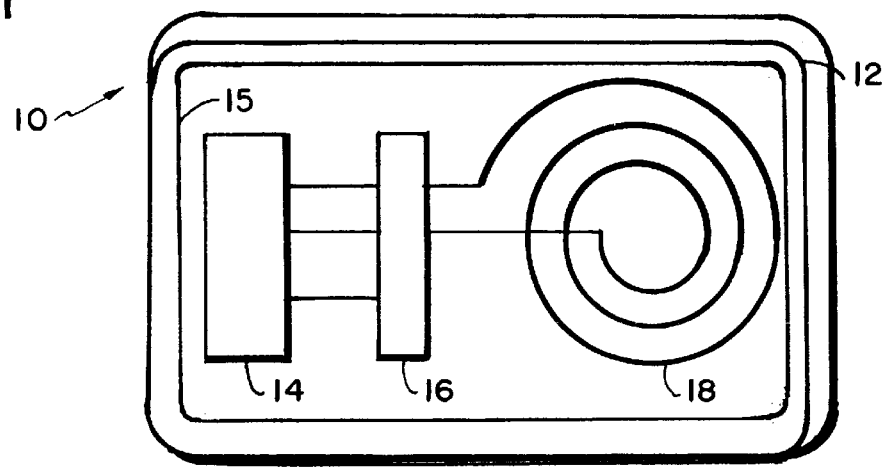
FIG. 1 is a schematic representation of an improved security document according to a preferred embodiment of the present invention.

Preferred embodiments according to the present invention will be described with reference to the accompanying drawings wherein like reference numerals indicate like elements to avoid repetitive description. FIG. 1 shows an improved security identification document 10 according to a preferred embodiment of the present invention. The document 10 preferably includes a substrate 12 which may preferably comprise two or more layers of a suitable substrate material such as paper, plastic, polymers or other known materials. Embedded within the substrate 12 is an integrated circuit IC including a microcontroller 14 such as a known microprocessor, central processing unit or other suitable device disposed thereon. As is well known, the microprocessor 14 includes memory and is programmable and capable of receiving, storing, retrieving and transmitting data.

The memory included in the microprocessor 14 may include FRAM memory or other suitable memory such as DRAM, SRAM, flash memory or other suitable memory devices.

A specially designed metal ring 15, preferably made of SUS 304 stainless steel, is located on the substrate 12 to provide mechanical strength to the document 10 for protecting the integrated circuit.

The document 10 also includes an input/output interface device (I/O device) 16 preferably in the form of a known radio frequency interface input/output chip including suitable signal processing electronic components and circuitry. The I/O device 16 is connected to the microcontroller 14 so as to receive and transmit signals to and from the microcontroller.

Also disposed in the substrate 12 is an antenna 18 preferably in the form of an etched coil, air wound coil or other like coils. The antenna 18 is disposed in the substrate 12 such that the I/O device 16 connects the antenna 18 to the microprocessor 14.

The microprocessor 14 and I/O device 16 of the integrated circuit are preferably in the form of electronic component chips, such as well known silicon chips which are capable of receiving, storing and transferring data using known contactless communication protocols such as radio frequency transmission and reception communication protocols.

As will be described in the following paragraphs, the antenna 18 receives electrical signals preferably in the form of radio waves from an improved security identification document interface device to be described later. The signals are received from a primary coil in the improved security identification document interface device by the antenna 18 in a contactless manner, i.e. there is no galvanic contact, between the primary coil and the antenna 18. Upon receiving the signals, the antenna 18 is energized and then transmits the received signals to the I/O device 16. The I/O device 16, at different time intervals, converts the input radio frequency signals into five different signals: Ground, $V_{cc}$, Reset, Clock and Serial Input/Output to be transmitted to the microprocessor 14 as is known in contactless communication protocols.

The document 10 is normally in a sleep mode in which the components 14, 16 are not powered up. After receiving an input signal and being powered up, the microcontroller 14 is ready to receive and transmit data. Thus, it is not necessary for the improved security identification document 10 to have an internal power source. Instead, the power required for operating the electronic components embedded on the document 10 is received from the improved security identification document interface device to be described later.

Before the document 10 allows data to be stored therein or data stored in the document 10 to be retrieved or read, the I/O device 16, using suitable programming and/or electronic components first determines whether an authorized improved security identification document interface device has transmitted signals to the antenna 18 and whether such interface device is authorized to read or write data. In addition, the I/O device 16 can determine whether the data being transmitted by the interface device to the document 10 is properly encrypted using the proprietary and secret encryption scheme before allowing data to be transmitted to or from the microprocessor 14.

If the data transfer is authorized by the I/O device 16, data is then received from the document interface device by frequency and amplitude modulation performed by the I/O device 16 using known discrete electronic components and signal processing methods. The microcontroller 14 is programmed such that if no signals are received for predetermined period of time, the microcontroller 14 is deactivated and re-enters the sleep mode.

More details are shown in FIGS. 2–6 which describe a method of making an improved security identification document according to a preferred embodiment of the present invention, the microprocessor 14, I/O device 16 and antenna 18 mounted on the substrate 12 are incorporated or embedded into a document or card to form an improved security identification document. The method according to a preferred embodiment of the present invention first involves the step of making a contactless communication document 10 which comprises the microprocessor 14, I/O device 16 and antenna 18 mounted on the substrate 12 which can be laminated using polyester or similar base material to form a contactless insert unit 20. On the contactless insert unit 20, an amine-based epoxy, such as the known adhesive DP125, is preferably applied over the IC region. Upon being fully cured, this amine-based epoxy acts as a cushion layer, thus providing additional protection to the IC.

Figure 2:
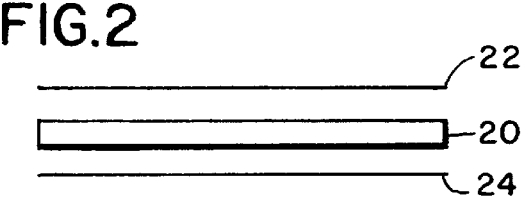
FIG. 2 is a cross-sectional view of a first step in a method of making an improved security identification document according to a preferred embodiment of the present invention.

Next, as shown in FIG. 2, the contactless communication insert unit 20 is inserted between two layers 22 and 24. Each of the layers 22, 24 may preferably comprise of a sheet of paper, plastic or other suitable base material for document.

The layers 22 and 24 are joined onto the contactless communication insert unit 20 preferably using adhesive such as the known adhesive DP640 or other suitable joining material. The adhesive is preferably coated onto the top and bottom surfaces of the unit 20 and then the layers 22 and 24 are joined to the respective top and bottom surfaces of the unit 20.

Figure 3:
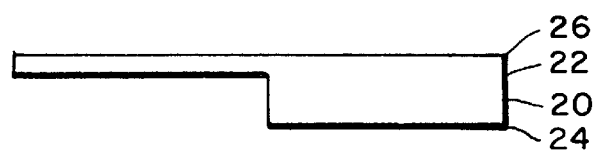
FIG. 3 is a cross-sectional view of a second step of the method of making an improved security identification document according to a preferred embodiment of the present invention.

FIG. 3 shows the second sequential step of the method of making an improved security identification document 10 according to a preferred embodiment of the present invention. A third layer 26 is preferably joined to the integral assembly of the unit 20 and layers 22, 24 formed by the method step shown in FIG. 2. The third layer 26 may also preferably comprise a sheet of paper or other suitable substrate material, and is preferably attached to the layer 24 using an adhesive such as a water based adhesive or other suitable joining material. Layer 26 may contain preferably alphanumeric data or text 40 which includes personal information such as name, address, birth date, country of citizenship, passport number, social security number and any other suitable information, visible to human eyes.

Figure 4:
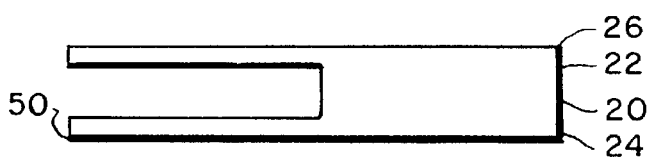
FIG. 4 is a schematic view of a third step of the method of making an improved security identification document according to a preferred embodiment of the present invention.

As seen in FIG. 4, it is also preferable to have a protective cover sheet 50 stick to layer 26 preferably using a water based adhesive or other suitable adhesive. The protective cover sheet 50 can be a laminate sheet or other suitable protective cover layer.

Figure 5:
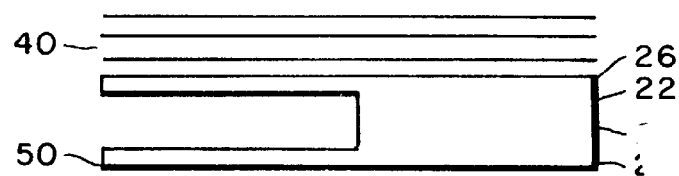
FIG. 5 is a schematic view of a fourth step of the method of making an improved security identification document according to a preferred embodiment of the present invention.
Figure 6A:
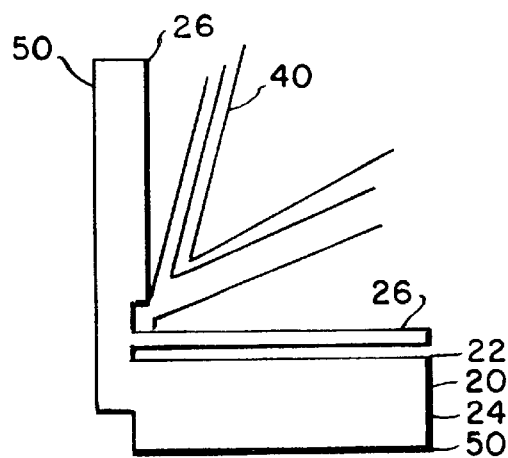
FIG. 6a is a schematic view of a final step of the improved security identification document according to a preferred embodiment of the present invention wherein the improved security identification document in a book form.
Figure 6B:
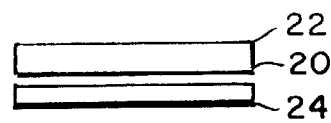
FIG. 6b is a schematic view of a final step of the improved security identification document according to a preferred embodiment of the present invention wherein the improved security identification document in a card form.

In addition, if the document 10 is to be used as a permanent security document such as a personal identification document, for example, a passport or driver's license, the integral assembly including the layers 22, 24, the contactless communication insert unit 20, and the layer 26 including text 40 may be stitched to the cover 50 as shown in FIG. 5. This is similar to making a document such as a passport book as shown in FIG. 6a or a relatively hard substrate or cover such that used for a driver's license or similar identification card as illustrated in FIG. 6b.

The completed improved security identification document 10 as shown in FIG. 6 including the embedded contactless communication insert unit 20 provides for more secure and reliable identification and security because the data stored in the document 10 can only be accessed by an approved and authorized interface device and therefore, cannot be altered or tampered with. In addition, the data stored on the document 10 is preferably encrypted and compressed using secret and proprietary data encryption and compression schemes to provide additional security. Thus, the document 10 contains the conventional security features such as visible but tamper-proof identification data, as well as, novel and increased security features provided by the tamper-proof, embedded integrated circuit including the microprocessor 14, I/O device and antenna 18.

Figure 7:
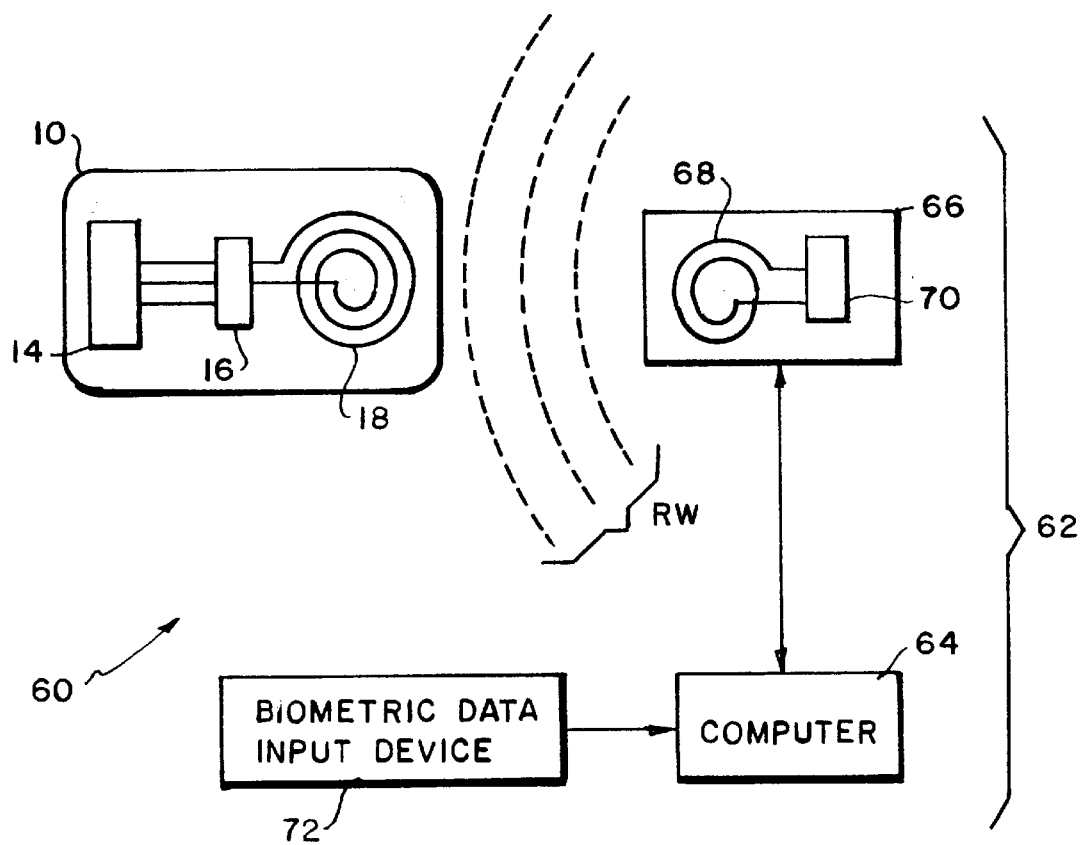
FIG. 7 is a schematic view of an improved security system utilizing the preferred embodiment of the present invention.

FIG. 7 shows an improved security system 60 which preferably uses the improved security identification document 10 as described in FIGS. 1–6. The system 60 includes an improved security identification document interface unit 62 which preferably includes a computer system 64 and user interface unit 66 connected to the computer system 64. The computer system 64 preferably comprises one or more known personal computers including a central processing unit, a storage unit, an operation system, a display unit, an input/output interface, a known communication hardware/software including fax modem and Internet access capabilities. The user interface unit 66 preferably comprises a primary coil 68 and a suitable I/O device 70 which may comprise known electronic hardware and software for performing known signal processing functions for contactless radio frequency communication. In addition, the I/O device 70 preferably includes appropriate programmable components and software for transmitting and reading received data using the system-wide proprietary, secret encryption and compression schemes.

When an improved security identification document is to be read or written on by the interface unit 66, the document 10 is brought into close proximity with the interface unit 66. Consequently, both devices 10 and 66 interact in a manner similar to a loosely coupled transformer. That is, the interface unit 66, sensing the presence of the document 10, transmits radio waves (RW) via the I/O device 70 and primary coil 68 to energize the coil or antenna 18.

The interface unit 66 is connected to and controlled by a suitable application software program stored in the computer system 64. The particular application software program can be programmed by one of ordinary skill in the programming art to perform the desired functions of the computer system 64 described herein.

When the computer system 64 expects to read data from the document 10, the system 64 transmits a signal to the document 10. The document 10 is then woken by the signal and is changed from being in a sleep mode to an active mode as described above. When the document 10 receives the signal call from the interface unit 66, the document 10 preferably transmits an acknowledging signal to the interface unit 66 after ensuring that the interface unit 66 is authorized to read and write data from and to the document 10 using the secret, proprietary data encryption scheme.

Data exchange between the document 10 and the interface unit 66 thus occurs, transmitting the necessary data to and from the document 10. The encrypted security data is then stored in the memory of the microcontroller 14 in the document 10. At the end of the data exchange, the interface unit 66 transmits a final signal to the document 10 to inform the document to return to the sleep mode.

The improved security system 60 also preferably includes at least one biometrics data input device 72 for receiving biometrics identifying data from a person. The biometrics data input device 72 may preferably comprise a known palm scanning/reading, facial image device for scanning a human palm or face, making an image of the palm or face and converting this image to data which can be processed and stored. Alternatively, the biometrics data input device 72 may also comprise one or more of the following known devices: facial image capture device, fingerprint scanner/reader, voice pattern processor, retina scanner or other known biometrics scanning and reading devices. The biometrics data input device 72 is attached to the computer system 64 for transferring the biometrics data input to the device 72 to the computer system 64.

The computer system 64 contains appropriate application software programs and memory for storing and processing data for maintaining security and verifying security identification documents. More specifically, the computer system 64 performs a matching function for comparing biometrics data and other data received from the microprocessor 14 of the improved security identification document 10 with biometrics data input via the biometrics data input device 72. If the result of the comparison is no match of biometrics data, the computer system 64 generates a suitable indication or warning via the included display unit. If a match is found, the computer system 64 may also generate a suitable indication such as one or more audio or visual indications.

The computer system 64 may preferably be programmed to interact with the document 10 and the biometrics data input device 72 according to system requirements. For example, if the security system 60 is to be used for enforcing restricted access to a secured area, the computer system 64 may be programmed to check authorized personnel access data stored in the microprocessor 14 of the document 10 while confirming that the presenter of the improved security identification document 10 has not forged or tampered with the document 10 to gain unauthorized access to the secured area by comparing the biometrics data stored on the document 10 with biometrics data input to the computer system 64 via the biometrics data input device 72.

The application of the security system to an improved airport security system will be described in the following paragraphs.

Figure 8:
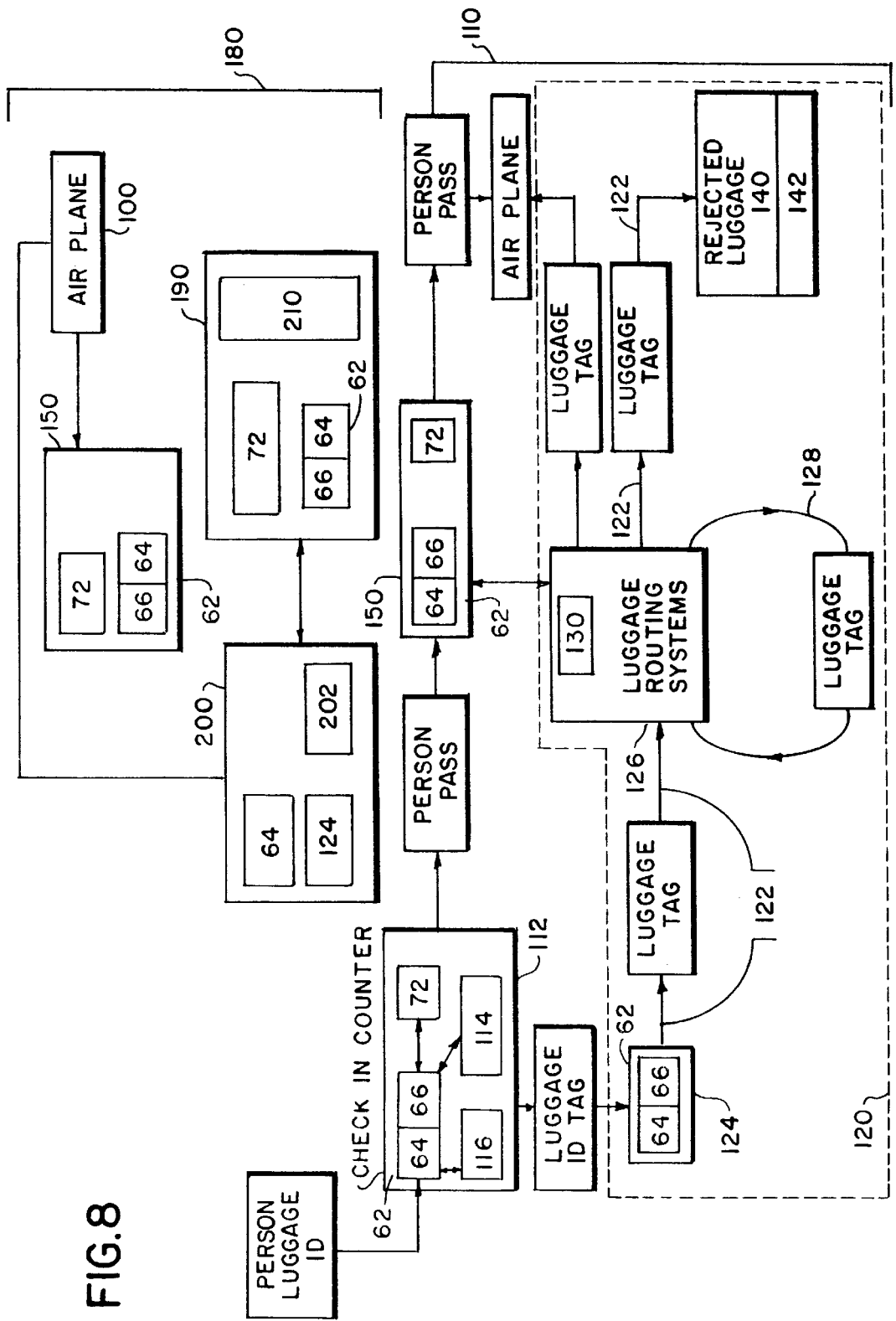
FIG. 8 is a schematic view of an improved airport security system utilizing the preferred embodiment of the present invention.

Another preferred embodiment of the present invention in the form of an improved airport security system 100 is shown in FIG. 8. The improved airport security system 100 preferably makes use of the improved security identification documents 12 described in FIGS. 1–6 and the elements 64–72 of the security system shown in FIG. 7.

The improved airport security system 100 includes a departure area 110 and an arriving area 180. Within the departure area 110, the first point of contact for a passenger is a check-in counter 112. It should be noted that the passenger may first be required to pass through an X-ray machine and/or a metal detector as is conventional for detecting forbidden weapons and items in the luggage or on a person. This is not shown as it is a conventional security measure which may be included in the security system 100.

At the check-in counter 112, the passenger presents to a ticket agent a ticket for authorized travel on a particular airline and an improved security identification document 10 such as a passport or a driver's license which is similar to the document 12 described in FIGS. 1–6. The passenger may also have luggage to be checked and loaded onto a cargo area of an airplane and carry-on luggage to be carried onto the plane by the passenger.

Located at the check-in counter 112 is an improved security identification document interface unit 62 including a computer system 64 and interface unit 66 and a biometrics data input device 72 as described with reference to FIG. 7. The check-in counter also includes a boarding pass generator 114 and a luggage identification document generator 116. The boarding pass generator 114 and the luggage identification document generator 116 are connected to the computer system 64 of the interface unit 62. The boarding pass generator 114 and luggage identification document generator 116 preferably include a known device for printing alphanumeric data such as flight information, departure airport, arrival airport, passenger name and other suitable information on a substrate. The substrate upon which this data is printed may preferably be the document 10 shown in FIGS. 1–6.

The computer system 64 of the interface unit 62 preferably includes all airline, flight and passenger information or is connected to another computer located elsewhere within the airport to retrieve this data.

Once the passenger presents a valid airline ticket, the ticket agent checks with the computer system 64 to be sure that the flight information and reservation are valid. Then, the passenger is requested to interface with the biometrics data input device 72 by, for example, facing a camera for facial capture, placing a palm or fingertips onto an appropriate biometrics scanning devices or other suitable biometrics capture devices. The passenger is also requested to provide an improved security identification document 10 which is then brought into proximity of the interface unit 66. As described with reference to FIG. 7, the biometrics data is input to the computer system 64 via the biometrics data input device 72 and compared with the biometrics data read from the document 10. If there is no match, a boarding pass is not issued and the passenger is refused entry until the problem or lack of a match can be cleared up.

If there is a match of biometrics data, a boarding pass is issued by the boarding pass generator 114. The boarding pass generator 114 generates a boarding pass in the form of an improved security identification document 10 including an integrated circuit IC containing the components 14, 16 and 18. The biometrics data input via the biometrics data input device 72 is transferred via the computer system 64 to the microprocessor 14 embedded in the document 10. Additional data such as data read from the personal identification document 10, i.e. passport, and other data such as flight and airline data may be included in the data transferred and stored in the microprocessor 14 of the boarding pass. The boarding pass, a version of improved security document is then given to the passenger.

If a passenger has luggage to be checked and loaded onto an airplane, the ticket agent accepts the luggage and issues a luggage identification document which is preferably in the form of an improved security identification document 10 described in FIGS. 1–6. The luggage identification document is generated by the luggage identification document generator 116 in a manner similar to the generating of the boarding pass by the boarding pass generator 114 as described above.

The biometrics data input via the biometrics data input device 72 to the computer system 64 is transferred to the microprocessor 14 or the designated memory area of the IC, embedded in the luggage identification document. Additional data such as data read from the personal identification document 10, i.e. passport, and other data such as flight and airline data may be included in the data transferred and stored in the microprocessor 14 or the designated memory area of the IC, of the luggage identification document. The luggage identification document is then adhered to or connected to the luggage and the luggage is sent to a luggage handling system 120.

After receiving a boarding pass, the passenger proceeds to the appropriate gate security unit 150 which may be located at the boarding gate or may be located at the entrance to the airplane. Alternatively, two gate security units 150 may be provided, one at the entrance to the boarding area and another at the entrance to the airplane.

The gate security unit 150 preferably includes an interface unit 62 for reading the boarding pass in the form of an improved security identification document 10 and a biometrics data input device 72. Before allowing the passenger to enter the boarding area or the airplane, the passenger is requested to interact with the biometrics data input device 72 and present the boarding pass. The biometrics data contained on the boarding pass is read by the interface unit 62 and the biometrics data from the input device 72 is input to the computer system 64. The computer system 64 then compares the biometrics data and issues an indication as to whether the biometrics matches or not. If there is no match, the passenger is not allowed to enter the boarding area or the airplane. In addition, the computer system 64 sends a signal to a computer system 64 connected to the luggage handling system 120 to indicate that the luggage of the unmatched or un-reconciled passenger should be removed from the luggage handling system 120 to a secure, fortified area until the problem can be rectified.

If increased security is required, the passenger may be required to also present the personal identification document 10 such as a passport or driver's license so that the biometrics data contained on the personal identification document 10 can be matched with the biometrics data stored on the boarding pass and the biometrics data input by the passenger to the input device 72.

If there is a match of biometrics data at the gate security unit 150, the passenger is allowed to board the airplane. The computer system 64 at the gate security unit 150 includes appropriate software and interacts with the flight and passenger data to maintain a continuous account of all passengers who have boarded the airplane and those who have not. Thus, the computer system 64 at the gate security unit can easily identify those passengers who have received a boarding pass and have not yet boarded the airplane or entered the boarding gate area.

While the passenger is traveling to the boarding gate area, the passenger-checked luggage is transferred to the luggage handling system 120. The luggage handling system includes a conveyor system 122 and one or more luggage identification document reading devices 124. The luggage identification document reading device 124 preferably comprises an interface unit 62 including the improved security identification document interface device 66 and computer system 64.

As the luggage containing the improved security luggage identification documents 10 are moved along the conveyor system 122 past the reading device 124, the reading device 124 of the luggage handling system 120 preferably uses radio frequency communication protocols similar to those used in the improved security identification document interface devices described above so as to detect radio frequencies in a 360 degree dimension thereby eliminating misreads as is so common with conventional character recognition devices. The reading devices 124 using the contactless radio frequency data communication allows for rapid two way radio communication between the luggage handling system and the improved security luggage identification documents contained on the luggage. More specifically, as the luggage passes the reading devices 124, the reading devices 124 transmit radio frequency signals to the improved security luggage identification documents contained on the luggage. Then, the luggage identification documents 10 emit their own radio messages which include luggage identification and other information such as luggage destination as is described with reference to the operation of the system shown in FIG. 7.

The reading devices 124 input the data read from the luggage identification documents into the computer system 64 of the luggage handling system 120. The computer system 64 of the luggage handling system 120 is preferably connected to the computer system 64 at the gate security unit 150 and possibly the computer system 64 at the check-in counter 112. This allows the automated luggage handling system 120 to receive a signal from either computer system 64 at the gate security unit 150 or check-in counter 112 instructing the luggage handling system 120 to reject a particular piece of luggage if there is a mismatch of biometrics data at the gate security unit 150.

After the luggage is transported along the luggage conveyor system 122 from the check-in counter 112 to a luggage routing system 126 which preferably includes a routing loop conveyor 128 and another luggage identification document reading device 130. The luggage preferably moves along the routing loop conveyor 128 until the luggage identification document reading device 130 signals that the luggage should be moved to the airplane for loading into the cargo area thereof or until the luggage identification document reading device 130 indicates that the luggage should be moved to a secured, fortified area 140 for rejected luggage.

Instead of using a routing loop conveyor 128, a luggage holding area may also be used wherein not-yet-reconciled luggage is held until the passenger successfully passes through the gate security unit 150 and boards the airplane. Such a luggage holding area would also preferably include one or more luggage identification document reading devices for identifying luggage which has been reconciled and should be sent to the airplane for loading.

The area 140 for rejected luggage may also include a luggage identification document reading device 142 which can locate and identify an item of luggage which was previously un-reconciled and now has been reconciled, so as to retrieve previously un-reconciled luggage and send the now reconciled luggage to the airplane for loading.

At the arriving area 180, there is preferably a gate security unit 150 located at the arrival gate. This gate arrival unit may preferably include a biometrics data input device 72 and computer system 64 which may be connected to the computer system 64 of the departure gate security unit 150 or able to read data from the departure gate security unit 150 stored on a disk or other storage medium. As passengers leave the airplane and pass through the gate security unit 150, they are preferably requested to interact with the biometrics data input device 72 which transfers the biometrics data to the computer system 64. In this way, it can be determined if all of the arriving passengers have exited the airplane and it can also be used to record entry into a particular country.

The arriving area 180 also preferably includes a luggage retrieval system 190 which includes a biometrics data input device 72 and computer system 64 which is connected to a computer system 64 contained in a luggage handling system 200. The luggage handling system 200 also includes an improved security luggage identification document reading device 124 which is also connected to the computer system 64 of the luggage handling system.

When a passenger arrives at the luggage retrieval system 190 to retrieve luggage, the passenger interacts with the biometrics data input device 72. The biometrics data input device 72 inputs biometrics data from the passenger and transmits this data via the computer system 64 of the luggage retrieval system 180 to the computer system 64 contained in the luggage handling system 200. The computer system 64 contained in the luggage handling system then sends a signal to the improved security luggage identification document reading device 124 for identifying the particular item of luggage and then sending that particular item of luggage via a conveyor system 202 of the luggage handling system to the passenger.

Before a passenger is allowed to leave the luggage retrieval area, the passenger may be required to pass through another security unit 210 which preferably includes a biometrics data input device 72, an improved security identification document interface device 62 including a computer system 64 and an interface unit 62. The computer system 64 compares the biometrics data input by the passenger via the input device 72 with the biometrics data read by the interface unit 62 from the improved security luggage identification document contained on the luggage. If a match occurs, the passenger and claimed luggage is permitted to leave the luggage retrieval area. If there is no match, the passenger and luggage are detained until the error can be corrected.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making an identification document comprising the steps of:

forming a contactless communication insert unit by electrically connecting an integrated circuit including a microprocessor, a controller, a memory unit, a radio frequency input/output device and an antenna, and disposing a metal ring to surround the integrated circuit;

disposing the contactless communication insert unit on a substrate and laminating it to form a laminated substrate;

supplying a first sheet of base material;

supplying a second sheet of base material;

disposing the second sheet of base material on top of the first sheet of base material and inserting the laminated substrate including the contactless communication insert unit between the first and second sheets of base material; and joining a third sheet of base material to the first and second sheets of base material having the laminated substrate disposed therebetween, the third sheet of base material containing printed text data located so as to be readable by humans.

2. A method of making an identification document according to claim 1, further comprising the step of attaching a cover page to the third sheet of base material.

3. A method of making an identification document according to claim 2, wherein the third sheet of base material containing the printed text data is joined to the cover page and the second sheet of base material via tamper-proof stitching.

4. A method of making a security document according to claim 1, further comprising the step of supplying a cover comprising a relatively rigid material compared to the first, second and third sheets of base material and joining the cover to the first, second and third sheets of base material for supporting the integrated circuit.

5. A method of making a identification document according to claim 1, wherein the memory unit includes memory for storing biometrics data and memory for storing non-biometrics data, the memory for storing biometrics data including a plurality of memory locations which can only be written to once and prevent the stored data from ever being altered, the memory for storing non-biometrics data including memory locations which are capable of being altered.

6. A method of making an identification document according to claim 5, wherein the biometrics data includes at least one of a still photograph, moving video images, a palm print, fingerprints, a retina scan, a voice print, a two-dimensional facial image and a three-dimensional facial image.

7. A method of making a security document according to claim 6, wherein data stored in the memory unit is encrypted.

* * * * *